United States Patent [19]

Nave

[11] 4,311,303
[45] Jan. 19, 1982

[54] FLEXURAL PIVOT MEMBER
[75] Inventor: William E. Nave, South Bend, Ind.
[73] Assignee: The Bendix Corporation, Southfield, Mich.
[21] Appl. No.: 149,066
[22] Filed: May 12, 1980
[51] Int. Cl.³ ............................................... F16F 1/26
[52] U.S. Cl. .................................... 267/160; 188/381
[58] Field of Search ............... 188/1 B; 267/136, 160, 267/162, 165, 154; 248/610, 612, 618

[56] References Cited

U.S. PATENT DOCUMENTS

| | | | |
|---|---|---|---|
| 2,989,298 | 6/1961 | Ljungström | 267/160 |
| 3,073,584 | 1/1963 | Troeger | 267/160 |
| 3,319,951 | 5/1967 | Seelig | 267/160 |
| 3,743,268 | 7/1973 | Heiland et al. | 267/160 |

OTHER PUBLICATIONS

S. Mukai, IBM *Technical Disclosure Bulletin, Torsion Bar Damping Device;* vol. 3, No. 10, Mar. 1961.

*Primary Examiner*—Duane A. Reger
*Attorney, Agent, or Firm*—Leo H. McCormick, Jr.; Ken C. Decker

[57] ABSTRACT

A flexural pivot for transferring an input force through a lever to develop an output force. The flexural pivot has a housing with a horizontal support and a vertical support. A first rectangular bar has a first end attached to the horizontal support and a second end attached to the lever. A second rectangular bar has a first end attached to the vertical support and a second end attached to the lever. The second ends of the first and second rectangular bars are attached to the lever to establish a fulcrum. The first bar holds the fulcrum in a substantially fixed horizontal position and the second bar holds the fulcrum in a substantially fixed vertical position whenever an input force is applied to the lever while allowing the lever to pivot about the fulcrum as a function of the twisting moment in the first and second bars.

8 Claims, 3 Drawing Figures

FLEXURAL PIVOT MEMBER

BACKGROUND OF THE INVENTION

This invention relates to a flexural pivot for transferring an input force through a lever to produce an output force.

Prior art flexural pivot devices, such as disclosed in U.S. Pat. Nos. 3,073,584 and 3,319,951 have a cylindrical core member connected to a sleeve by flat springs. The sleeve is usually connected to receive an input force which is transferred through the springs to the inner core which supplies an output force to another member. For most applications, a fastener extends through the cylindrical core to attach the pivot device to a housing. Unfortunately after the repeated transfer of the input force through the pivot devices, the fastener may loosen and allow the sleeve and core to rotate from a null position to different positions. Thereafter, any input force applied to the sleeve for moving the cylindrical core to provide an output force to the other member is off by an amount equal to the misalignment from the null position.

SUMMARY OF THE INVENTION

The flexural pivot disclosed herein has a housing with a base attached to a fixed wall. The base has first and second projections extending therefrom. One projection has a horizontal surface thereon with respect to the base and the other projection has a vertical surface. A first rectangular bar which has a width and a thickness such that the width is greater than the thickness, has a first end fixed to the horizontal surface end. A second rectangular bar substantially identical to the first bar, has a first end fixed to the vertical surface and a second end. The second ends of the rectangular bars are fixed to a lever to establish a fulcrum for the lever. The first rectangular bar holds the fulcrum in a stationary horizontal plane and the second rectangular bar holds the fulcrum in a stationary vertical plane. An input force applied to one end of the lever causes the fulcrum to rotate about a point where the horizontal and vertical planes of the rectangular bars intersect and provide an output force from the other end of the lever. The angular movement of the lever in reponse to input force is directly dependent on the twisting movement developed in the first and second rectangular bars. The twisting movement can be varied by changing the relationship between the width, thickness and length of the rectangular bar selected so that a minimum input force is required before an output force is produced to operate another device. Thus, any false actuation signals can be dampened before the other device is actuated.

In a secondary embodiment a cylindrical connector joins the first and second rectangular bars together to horizontal and vertical planar relationship between the first and second bars. A collar on the lever surrounds the cylindrical connector to establish the fulcrum for the lever. An adjustment screw on the collar allows the first end to be moved to a null or neutral position whereby movement of the second end is completely dependent on the twisting movement developed in the first and second rectangular bars.

In another embodiment, the cylindrical connector has a slot therethrough that is substantially perpendicular to its cylindrical axis. The lever which is located in the slot is fixed to the cylindrical connector by a fastener. The fastener allows the lever to move in the slot and thus change the position of the fulcrum on the lever. By changing the fulcrum position, the linear movement of the input end to the output end of the lever can be modified to meet different operating needs of the device receiving the signal from the input signal.

It is an advantage of this flexural pivot that the input lever is adjustable after the housing is fixed to a support in order to assure that the lever is in a null position in the absence of an input signal.

It is another advantage of this invention in that the flexural pivot does not rotate on the fastener for holding the housing to a support.

It is an object of this invention to provide a flexural pivot with a fulcrum for a lever by fixing rectangular horizontal and vertical bars to a connector, the horizontal bar holds the connector in a substantially fixed horizontal plane while the vertical bar holds the connector in a substantially vertical plane. An input force applied to a first end of the lever causes the lever to pivot about the fulcrum and provide a second end of the lever with an output force. The output force derived from the input force is a function of the twisting movement produced in the horizontal and vertical bars and the relationship of the fulcrum with respect to the first and second ends of the lever.

These and other objects should be apparent from reading this specification while viewing the drawings.

BRIEF DESCRIPTION OF THE INVENTION

DETAILED DESCRIPTION OF THE INVENTION

Figure 1:
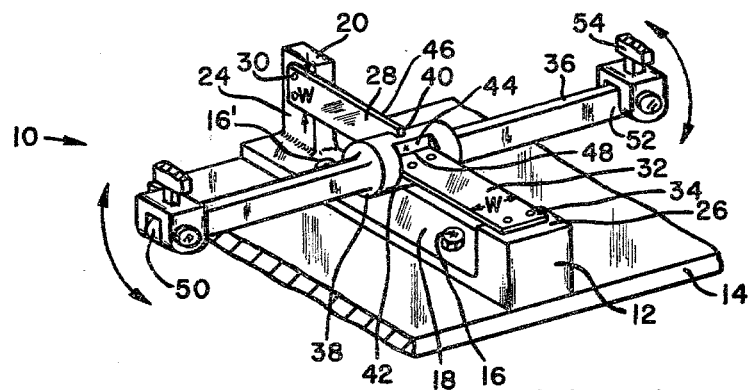
FIG. 1 is a perspective view of a flexural pivot made according to the principles of this invention.

The flexural pivot 10 shown in FIG. 1 has a bracket or housing 12 that is connected to a support 14 by a plurality of bolts 16, 16', etc. The bracket or housing has a base 18 with a first and second projection 20 and 22 extending therefrom. The first projection 20 has a horizontal surface 24 that is in a plane substantially perpendicular to the base 18 while the second projection 22 has a vertical surface 26 that is in a plane substantially parallel to the base 18.

A first rectangular bar 28 has a thickness "t", a width "w" and a length "l". The width "w" which is always greater than the thickness "t" of the rectangular bar 28, is aligned with the horizontal surface 24 of the first projection 20.

A first end 30 of rectangular bar 28 is attached to the projection 20 in order to hold the surface of rectangular bar 28 identified as "w" in a horizontal plane parallel to surface 24 on projection 20.

A second rectangular bar 32 which is identical for most applications to bar 28 has a first end 34 attached to the vertical surface 26 of projection 22 to hold the surface of bar 32 designated as "w" in a plane substantially parallel to base 18 and to the vertical surface 26 on projection 22.

A lever 36 has a section 38 which is shown as cylindrical with a slot 40 and a groove 42 therein. Surface 44 of slot 42 is perpendicular to both slot 40 and the bottom of slot 42. End 46 of bar 28 is located in slot 40 and welded to the cylindrical section 28 and end 48 of bar 32 is located in slot 42 and welded to the bottom thereof to establish a solid link between the first and second projections 20 and 22.

For some applications it may be desirable to make lever 36 from a molded material With the exception of slot 42 which is molded to a shape similar to slot 40 to provide lateral support for both sides of the "w" dimension of the bars, the molded lever 36 is identical to that shown in FIG. 1.

An input force applied to end 50 of lever 36 causes the lever to pivot about the fulcrum point created by the intersection of the extension of the horizional and vertical planes that pass through the length of bars 28 and 32 in the rest position. As the cylindrical section 38 rotates, end 52 rotates through an arc to provide an output member 54 with a corresponding force.

The rotation of the section 38 by the input force is dependent on the twisting moment produced in bars 28 and 32. The twisting moment which can be modified by changing one or more of the following: the thickness "t", widths "w" or length "l" of the rectangular bars 28 and 32. The relationship of the thickness "t" to width "d" of bar 28 is such that the section 38 is held in a substantially fixed horizontal position and of bar 32 is such that the cylindrical section 38 is held in a substantially fixed vertical position. Thus, the total input applied to end 50 causes the cylindrical section to rotate in a plane perpendicular to both bars 28 and 32 in supplying end 52 with an output force for operating a device connected to linkage 54. Since the rotation of end 52 is dependent on the twisting movement of bars 28 and 32, it is possible to dampen or delay the movement of end 52 until the input force applied to end 50 reaches a predetermined value.

For some applications it may be necessary to adjust the position of the lever 36 in order that no twisting moment is produced in bars 28 and 32 in the absence of an input force. Since the cylindrical section 38 and horizontal and vertical surfaces 24 and 26 hold the bars 28 and 32 in planes that are substantially 90° from each other, it is necessary to provide a means for adjusting the end of the lever 36 and as a result, the flexural pivot 210 shown in FIG. 2 was developed.

Figure 2:
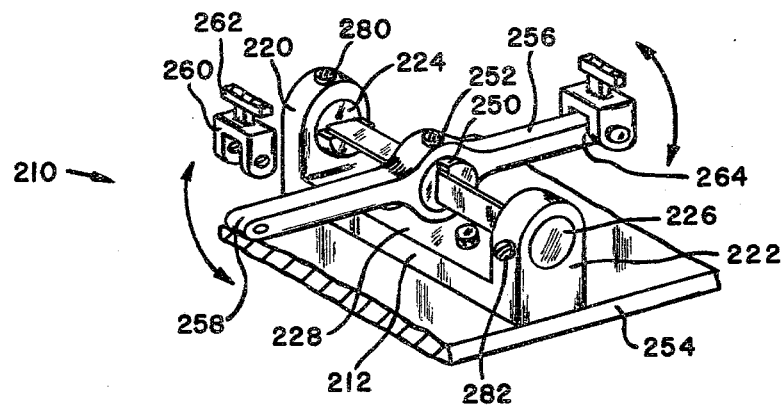
FIG. 2 is a perspective view of the flexural pivot of FIG. 1 showing an adjustment mechanism for positioning a lever in a null position.

The flexural pivot 210 shown in FIG. 2 has a bracket or housing with a base 228 from which project first and second support arms 220 and 222. Arms 220 and 222 have axial bores 224 and 226 extending therethrough which are substantially parallel to base 228. A horizontal set screw 280 extends through arm 220 into bore 224 and a vertical set screw 282 extends through arm 222 into bore 26.

A first cylindrical member 230 has a flat 232 on one end thereof and a second cylindrical member 234 has a flat, not shown, on the end thereof. A third cylindrical member 238 has a first flat 240 and a second flat, not shown, opposite ends thereof. The flats 240 and 242 on cylindrical member 238 located in planes that are substantially 90° from each other.

A first rectangular bar or strip 244 is attached to flat 232 and the flat on the end of the cylindrical member 238. A second rectangular bar or strip 248 is attached to flat 242 and the flat on the cylindrical member 234. On attachment of bars 244 and 248, a solid link is produced between the first and second cylindrical members 230 and 234 which holds the first and second rectangular bars 244 and 248 in planes substantially 90° from each other.

The first cylindrical member 230 which is located in bore 224 and the second cylindrical member 234 is located in bore 226 is fixed to arms 220 and 222 by set screws 280 and 282 which are brought into engagement with the first and second cylindrical members 230 and 234 to fix the position of bars 244 and 248 within the housing.

As the first cylindrical member 230 is being moved from the second bore 226 to the first bore 224, it passes through a bore 250 in collar 252 on lever 256. When the first and second cylindrical members 230 and 232 are locked in arms 220 and 222 to prevent rotation thereof and base 228 of the housing fixed to support 254 by bolts 212, only one is shown. Thereafter, end 258 is rotated into engagement with yoke 260 on the input member. Set screw 262 is tightened to lock the position of collar 252 with respect to the third cylindrical member 238. Thus even though lever 256 is in a different plane than either of the rectangular bars 244 and 248, the rigidity thereof prevents movement of the third cylindrical member 238 from the axial center of a line that passes through bores 224 and 226.

On receiving an input force from input member 262, end 258 moves in an arc about a fulcrum point formed by the intersection of the planes in which the rectangular bars 244 and 248 are located in the rest position. As end 258 rotates in the arc about the fulcrum, end 264 moves to provide a device with an operational signal.

Figure 3:
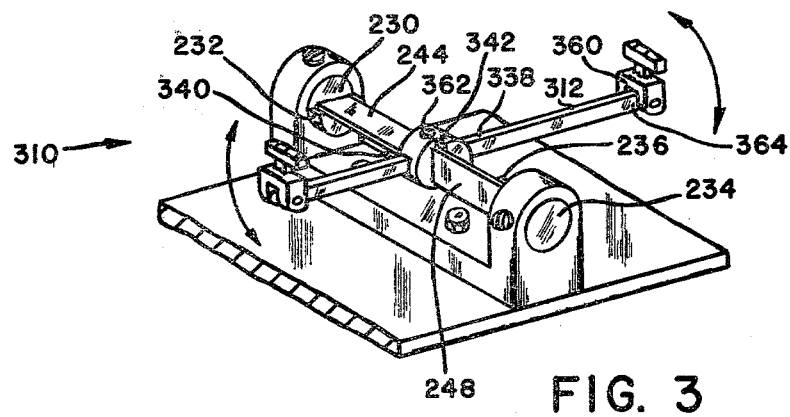
FIG. 3 is a perspective view of the flexural pivot of FIG. 1 showing an adjustment mechanism for changing the position of the lever with respect to a fulcrum.

At times it may be desirable to be able to adjust the amount of linear rotation produced by movement of the input end of the lever with respect to the output end. To achieve this operational modification the flexural pivot 310 shown in FIG. 3 was developed. Since the flexural pivot 310 is identical to the flexural pivot 210 shown in FIG. 2 with the exception of the lever 312 and cylindrical member 338, the remaining components are numbered the same as in FIG. 2.

The third cylindrical member 338 in addition to having flats 340 and 342 located on opposite ends thereof and in planes substantially 90° from each other, has a rectangular slot 354 that extends therethrough in a plane substantially perpendicular to the axial center of the cylindrical member 338. A set screw 362 extends through the cylindrical member 338 into slot 354. After the first and second cylindrical members 230 and 234 are locked in arms 220 and 222, and housing 212 fixed to support 254, lever 312 is placed in slot 354 and moved into engagement with yoke 360 on the output member. Thereafter the input force applied to rotate end 358 about the fulcrum point as transmitted by end 364 is modified by the relationship of the lever ratio between the fulcrum point and ends 358 and 364. This lever ratio can be adjusted for different applications, for instance, if the input force applied to end 358 is derived from oscillation forces of varying intensity, until the force reaches a value sufficient to move end 358 through a fixed linear distance, end 364 does not move yoke 360 sufficiently to actuate a switch, not shown, connected thereto.

Thus, the invention disclosed herein provides a flexural pivot point through which an input force can be transferred through a lever to produce an output force sufficient to activate or operate a device attached thereto.

I claim:

1. A flexural piviot comprising:

a housing having a base with a horizontal support separated from a vertical support surface;

a first bar having a first end fixed to said horizontal support and a second end, said first bar having a cross sectional shape of a first width and a first thickness, said first width being greater than the first thickness and located in a plane substantially parallel to said horizontal support;

a second bar having a third end fixed to said vertical support and a fourth end, said second bar having a cross sectional shape of a second width and second thickness, said second width being greater than the second thickness and located in a plane substantially parallel to said vertical support;

a lever arm having an input end separated from an output end by a fulcrum created by fixing the second and fourth ends of the first and second bars, respectively, to the lever arm, said input end receiving an input force, said first width of the first bar and the second width of the second bar holding the fulcrum in a substantially fixed position with respect to the horizontal and vertical support surfaces to allow the input force to rotate the lever in a plane perpendicular to said first and second bars and provide said output end with angular movement corresponding to a twisting moment in the first and second bars.

2. In the flexural pivot as recited in claim 1 wherein said twisting moment is controlled by varying the thickness of the first and second bars with respect to the widths.

3. In the flexural pivot as recited in claim 1 wherein said twisting moment is controlled by varying the width of the first and second bars with respect to the thickness.

4. In the flexural pivot as recited in claim 1 wherein said twisting moment is controlled by varying the length of the first and second bars with respect to the thickness and width.

5. In the flexural pivot as recited in claim 1 wherein said lever further includes:

adjustment means for moving said input and output ends to a null position to eliminate ay twisting moment in the first and second bars in the absence of an input force.

6. A flexural pivot comprising:

a housing having a base with first and second projections extending therefrom, said first projection having a first bore extending therethrough, said second projection having a second bore extending therethrough, said first and second bores being substantially parallel to said base;

a first bearing member located in said first bore;

a second bearing member located in said second bore;

a first strip of material having a greater width than thickness and a first end fixed to said first bearing member and a second end;

a second strip of material having a greater width than thickness and a third end fixed to said second bearing member and a fourth end;

a connector member fixed to the second end of the first strip and the fourth end of the second strip to align said strip in planes substantially 90° from each other;

fastener means for holding the first and second bearing member in a fixed position in said first and second bores, respectively;

a lever arm attached to said connector member to establish a fulcrum between an input end thereof and an output end therefor, said input end receiving an input force which causes the connector member to rotate about a point established by the intersection planes established by the position of the first and second strips to provide the output end with an output force, the rotation of said connector member being controlled by a twisting moment developed in the first and second strips.

7. In the flexural pivot, as recited in claim 6, wherein said connector member further includes:

adjustment means for moving the input end with respect to the connector member to vary the linear movement of the output end produced by angular rotation of the connector member.

8. In the flexural pivot, as recited in claim 6 wherein said lever includes:

a collar which surrounds said connector member; and a locking member for fixing the collar to the connector on movement of the input end to a null position.

* * * * *